Nov. 5, 1940.   R. C. REINHARDT   2,220,545

METHOD OF WELDING THERMOPLASTIC MATERIALS

Filed Nov. 20, 1937

INVENTOR
Robert C. Reinhardt
BY Griswold + Burdick
ATTORNEYS

Patented Nov. 5, 1940

2,220,545

UNITED STATES PATENT OFFICE 2,220,545

METHOD OF WELDING THERMOPLASTIC MATERIALS

Robert C. Reinhardt, Midland, Mich., assignor to The Dow Chemical Company, Midland, Mich., a corporation of Michigan Application November 20, 1937, Serial No. 175,591

5 Claims. (Cl. 18—59)

This invention relates to a method of welding thermoplastic materials, especially such materials as normally undergo decomposition when subjected to the oxidizing effect of a flame.

Many thermoplastic materials, and more particularly the new synthetic resins, are rapidly acquiring major importance in various fields of manufacture. It is frequently desirable to join two or more pieces of a thermoplastic material permanently and without unsightly seams, and, if possible, to effect the welding or joining operation to produce a strong joint. Most of the synthetic and many of the natural thermoplastics undergo considerable decomposition if brought into direct contact with a flame or with a source of heat under oxidizing conditions. It is therefore practically impossible to produce a welded joint between two or more articles of a thermoplastic material according to the old flame-welding procedure. While some adhesion between the articles may result from this technique, the joints are ordinarily the weakest part of the fabricated article.

It is accordingly an object of the invention to provide a process whereby thermoplastic materials, which are subject to decomposition under the oxidizing influence of a flame at elevated temperatures, may be welded or fused together without decomposition. It is a further object to provide a process whereby such welding may be acccomplished with the production of smooth joints which are substantially as strong as the main body of the thermoplastic mass.

In the accompanying drawing, forming a part of this specification,

I have now discovered that the foregoing objects can be readily and simply attained by causing a stream of a hot inert gas to impinge upon the joint between adjacent or contiguous thermoplastic bodies, the temperature employed being above the softening point of the particular thermoplastic to be welded.

For example, in welding together articles made of any of the synthetic thermoplastic resins such as polystyrene, poly vinyl chloride, polymerized acrylic acid esters, polymerized vinylidene chloride, and/or co-polymers of the foregoing, two pieces of the polymerized material are placed in juxtaposition and the contiguous portions may be welded by directing thereon a stream of hot nitrogen or other inert gas, such as carbon dioxide, at a temperature above the softening point of the particular resin, and preferably below the decomposition point thereof. The stream of gas may be heated by any suitable means such as, for example, an electric coil, and the temperature of the gas as it impinges upon the thermoplastic to be welded may be adjusted either by regulating the flow of the gas or by regulating the heat input in the gas-heating element. The melted thermoplastic material in the welded joint may be puddled in a manner similar to that employed in welding metals and should preferably be agitated. If desired, a "welding rod" of the same thermoplastic material may be employed to add bulk to the weld, thus preventing formation of a thin and unduly weak joint. The welding rod composition may contain more or less plasticizer than the material to be welded, thus modifying the properties of the joint. The stream of hot gas is finally discontinued and the puddled thermoplastic material in the joint is allowed to cool, thereby setting and forming a welded joint.

When welding sheet, rod, tubes, or shaped forms of vinylidene chloride polymers or co-polymers, the gas employed should be a non-oxidizing gas such as nitrogen. The same is true with respect to most other halogen-containing thermoplastics. When, however, polystyrene, the acrylic acid esters, or similar synthetic non-halogenated thermoplastics are to be welded, the gas may be nitrogen, a mixture of nitrogen and air, or in some cases air alone. In fact, depending entirely upon the material to be welded and the properties of the joint desired, the hot gas employed in the welding operation may be a reducing, oxidizing, or neutral medium.

Figure 1:
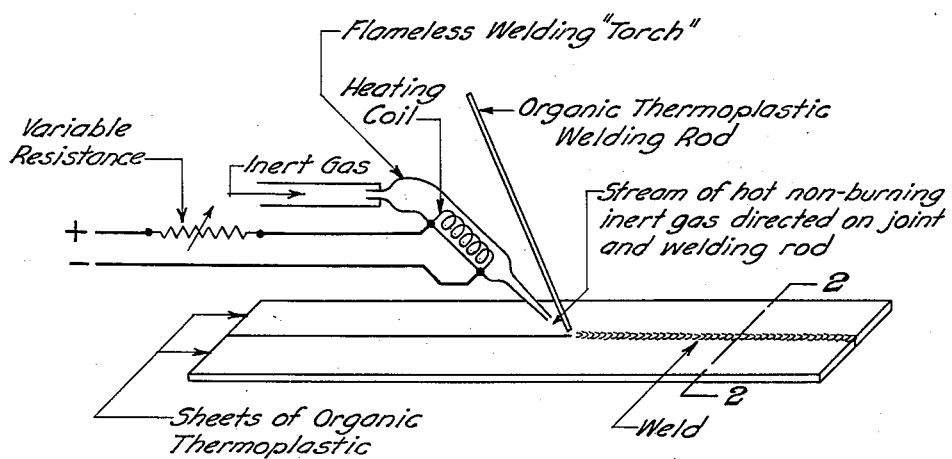
Fig. 1 illustrates the welding of two sheets of organic thermoplastic according to the hereinafter detailed method of the present invention, employing an organic thermoplastic welding rod, and a type of electrically heated welding "torch" more fully described hereinafter, the said torch delivering a stream of hot non-burning inert gas to the welding zone.
Figure 2:
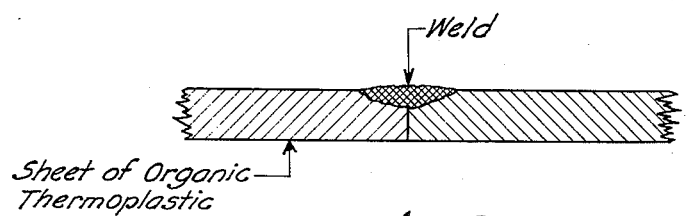
Fig. 2 is a view taken along the line 2—2 of Fig. 1, showing the welded seam in cross-sectional elevation.

A simple "welding torch" for employment in the above described operation has been made employing ordinary laboratory apparatus as follows: A piece of one-quarter inch internal diameter glass tube approximately 6 inches long was drawn out at one end to form a capillary one-sixteenth inch in diameter. A heating element made of nichrome wire, and having a total resistance of about 10 ohms, was sealed inside the glass tube near the capillary end, lead wires being brought out through the glass where contact was made with an external source of electrical energy. The large end of the glass tube was connected by means of a rubber hose to a source of gas supply, preferably a cylinder equipped with a pressure regulator. The voltage across the heating coil was controlled by a "variac" or by means of a variable resistance. The entire body of the torch was insulated by means of asbestos and the operation of the torch was similar to that of an oxy-hydrogen blow pipe except that no flame was employed. A torch of the type just described is illustrated in Fig. 1 of the annexed drawing.

The present process provides a convenient technique for welding thermoplastic materials without decomposition, and at low cost. It permits fabrication of many articles which cannot be made by other methods, especially materials of such intricate shape that molding or casting operations are impractical. In contrast with methods of joining thermoplastic articles employing a soldering iron or similar source of heat, the present process obviates the danger of decomposition due to oxidation and elevated temperatures, since the temperature of the gas employed in the present process is easily regulated within the range between the softening point and the thermal decomposition point of the thermoplastic. The joints obtained by the present welding process are much stronger than those producible by operations subject to the disadvantages inherent in flame-welding or soldering technique.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. The method of welding a thermoplastic synthetic organic resin which comprises juxtaposing two solid surfaces of like composition of such resin and directing thereonto a non-burning stream of a heated gas inert to the resin to heat the surfaces to a welding temperature, said gas being supplied at a temperature below the decomposition point of the resin.

2. The method of welding a thermoplastic synthetic organic resin which comprises juxtaposing two solid surfaces of like composition of such resin, directing thereonto a non-burning stream of a heated gas inert to the resin to heat the surfaces to a welding temperature, said gas being supplied at a temperature below the decomposition point of the resin, while puddling the fused resin in the joint, and discontinuing the stream of hot gas, thereby permitting the puddled resin to cool, producing a welded joint.

3. The method of welding a thermoplastic synthetic organic resin which comprises juxtaposing two solid surfaces of like composition of such resin, directing onto said surfaces and onto a welding rod of a similar thermoplastic resinous material a non-burning stream of a heated gas inert to the resin to heat the surfaces to a welding temperature, said gas being supplied at a temperature below the decomposition point of the resin, while puddling the fused resin in the joint, and discontinuing the stream of hot gas, thereby permitting the puddled resin to cool, producing a welded joint.

4. The method of welding vinylidene chloride polymers and co-polymers which comprises juxtaposing two solid surfaces of like composition of such polymeric bodies and directing thereonto a non-burning stream of a heated non-oxidizing gas, to heat the surfaces to a welding temperature, said gas being supplied at a temperature below the decomposition point of the polymer.

5. The method of welding vinylidene chloride polymers and co-polymers which comprises juxtaposing two solid surfaces of like composition of such polymeric bodies, directing onto said surfaces and onto a welding rod of a similar polymeric composition a non-burning stream of a heated non-oxidizing gas, to heat the surface to a welding temperature, said gas being supplied at a temperature below the decomposition point of the polymer, while puddling the fused vinylidene chloride polymer in the joint, and discontinuing the stream of hot gas, thereby permitting the puddled polymer to cool, producing a welded joint.

ROBERT C. REINHARDT.